(12) United States Patent
Elo (10) Patent No.: US 6,937,719 B2
(45) Date of Patent: Aug. 30, 2005

(54) MULTIPLEXING AND DEMULTIPLEXING OF NARROWBAND AND BROADBAND SERVICES IN A TRANSMISSION CONNECTION

(75) Inventor: Harri Elo, Helsinki (FI)

(73) Assignee: Nokia Networks Oy, Espoo (FI)

( * ) Notice: Subject to any disclaimer, the term of this patent is extended or adjusted under 35 U.S.C. 154(b) by 583 days.

(21) Appl. No.: 09/913,576

(22) Filed: Aug. 13, 2001

(65) Prior Publication Data

US 2003/0031312 A1 Feb. 13, 2003

Related U.S. Application Data

(63) Continuation of application No. PCT/FI00/00112, filed on Feb. 15, 2000.

(30) Foreign Application Priority Data

Feb. 15, 1999 (FI) .................................................. 990308

(51) Int. Cl.[7] ............................................. H04M 11/06
(52) U.S. Cl. .................. 379/398; 379/93.01; 379/93.05
(58) Field of Search .......................... 379/93.01, 93.05, 379/93.07–93.09, 398

(56) References Cited

U.S. PATENT DOCUMENTS

| | | | | |
|---|---|---|---|---|
| 4,443,662 A | | 4/1984 | Nakhla | |
| 4,794,353 A | * | 12/1988 | Broyde | 333/167 |
| 5,528,630 A | * | 6/1996 | Ashley et al. | 375/258 |
| 5,623,543 A | | 4/1997 | Cook | |
| 6,418,221 B1 | * | 7/2002 | Snow et al. | 379/93.05 |

FOREIGN PATENT DOCUMENTS

| | | |
|---|---|---|
| EP | 0677938 A1 | 10/1995 |
| EP | 0749272 B1 | 11/1996 |

OTHER PUBLICATIONS

Leonard T. Burton; RC–Active Circuits Theory and Design, Prentice–Hall, Inc., Englewood Cliffs, New Jersey, 1980.
John Cook and Phil Sheppard; "ADSL and VADSL Splitter Design and Telephony Performance", IEEE Journal on Selected Areas in Communications, vol. 13, No. 9, pp. 1634–1642, Dec. 1995.
International Search Report for PCT/FI00/00112.

* cited by examiner

Primary Examiner—Sinh Tran
Assistant Examiner—Daniel Swerdlow
(74) Attorney, Agent, or Firm—Squire, Sanders & Dempsey L.L.P.

(57) ABSTRACT

The invention relates to the implementation of narrowband and broadband services in a telecommunications network. A splitter element is connected to a transmission link, the splitter element comprising a passive low-pass filter block connected between the transmission link and a first interface, a high-pass filter unit connected between the transmission link and a second interface, and discrete impedance converting means for adapting the first interface to the characteristic impedance of the transmission link. In order that the impedance matching required by the low-pass filter block may be implemented in an economical way yet maintaining the service quality, the impedance converting means are entirely placed between the interface of the low-pass filter block on the transmission link side and the first interface.

2 Claims, 5 Drawing Sheets

MULTIPLEXING AND DEMULTIPLEXING OF NARROWBAND AND BROADBAND SERVICES IN A TRANSMISSION CONNECTION

This application is a continuation of international application serial number PCT/FI00/00112, filed 15 Feb. 2000.

FIELD OF THE INVENTION

The present invention relates generally to the implementation of a transmission connection via which both narrowband and broadband services are offered. More specifically, the invention relates to the separating of narrowband POTS/ISDN services from broadband services, particularly broadband services implemented with ADSL (Asymmetrical Digital Subscriber Line) technology. Narrowband services in this context denote services offered in the frequency range below the ADSL band.

BACKGROUND OF THE INVENTION

Optical fibre is a self-evident choice as a transmission medium for a core network, since trunk connections usually require high transmission capacity, the transmission distances used are long, and ready routes are often available for cables. Also for subscriber connections (line between a local exchange and a subscriber) the situation is rapidly changing, since various services implemented with multimedia, requiring a high transmission rate, will be commonplace from the point of an individual consumer as well.

However, no significant savings in the costs for constructing a future network offering broadband services can be foreseen, since the costs mainly arise from cable installation costs. However, it is desired to construct optical fibre also in the subscriber network as much as possible, since it is clearly seen that there will be a demand for it in the future. The costs of renewing subscriber networks are very high, however, and in terms of time, decades are actually involved in this context. High costs are indeed the principal impediment to the spreading of fibre to the subscriber network.

On account of the above reasons, the possibilities of utilizing conventional subscriber line (metal pair cable) for fast data transmission, i.e. for rates clearly above the rate of an ISDN basic access (144 kbit/s), have been mapped out more effectively than before. The present ADSL (Asymmetrical Digital Subscriber Line) and HDSL (High bit rate Digital Subscriber Line) techniques do offer new possibilities for transfer of fast data and video along the pair cable of a telephone network to subscriber terminals.

An ADSL transmission link is asymmetric in the sense that the transmission rate from network to subscriber is much higher than from subscriber to network. ADSL technology is mainly intended for various on-demand services. In practice, the rate of an ADSL transmission link from network to subscriber is in the order 2–6 Mbit/s and from subscriber to network in the order 32–640 kbit/s (mere control channel). (The data rate of an ADSL line is always n×32 kbit/s, where n is an integer.)

The HDSL transmission technique relates to the transfer of a 2 Mbit/s-level digital signal in a metal pair cable. HDSL transmission is symmetric, that is, the transmission rate is the same in both directions.

Since the above solutions only afford rates in the order 1–6 Mbit/s, a technique enabling ATM-level rates (10–55 Mbit/s) has also been sought for the pair cable of a subscriber line. The international standardization body ETSI (European Telecommunications Standards Institute) is working out a specification on VDSL (Very high data rate Digital Subscriber Line) equipment enabling such rates. By VDSL technology, both symmetric and asymmetric links can be implemented.

The above technologies, by which fast data is transferred through a pair cable, are called by the common name xDSL. Thus, even though it is not yet possible to offer broadband services to end users by utilizing optical fibre, by means of these techniques the present telephone operators are capable of offering said services through existing subscriber lines.

Since ADSL seems at the moment to be the most promising technique for implementing broadband services, it will be used as an example of the access technique by means of which the services are offered.

Figure 1:
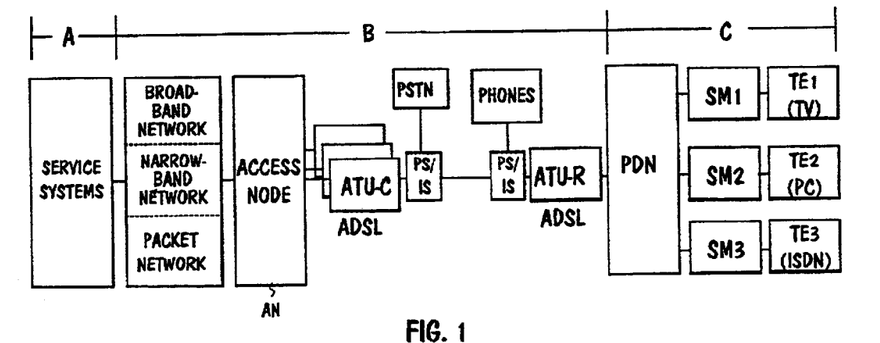
FIG. 1 illustrates the generic network model specified by the ADSL Forum.

The ADSL Forum has specified a generic network model for xDSL links; this is illustrated in FIG. 1. The device that connects to a subscriber line at the subscriber end is called ATU-R (ADSL Transmission Unit—Remote), and the device that connects to a subscriber line at the network end (e.g. at a local exchange) is called ATU-C (ADSL Transmission Unit—Central). These devices are also called ADSL modems (or ADSL transceivers), and they define between them an ADSL link. The high-speed data on the ADSL link is connected to the subscriber line in such a way that the subscriber can still use the old narrowband POTS/ISDN services, but the subscriber additionally has a high-speed data connection available. In principle, there are two ways to multiplex POTS and ADSL signals or ISDN and ADSL signals onto the same subscriber line: time division multiplexing or frequency division multiplexing. The present invention employs frequency division multiplexing, in which narrowband and broadband services are separated from one another by a splitter or cross-over carrying out the frequency division of ADSL signals and narrowband signals. The splitter can be a POTS/ADSL splitter PS or an ISDN/ADSL splitter IS.

The terminals TE at the end user can be of many different types, such as terminals TE1 of a cable TV network, personal computers TE2 or even ISDN phones TE3 if time division multiplexing is used. A service module SMi (i=1 . . . 3) is provided for each terminal, carrying out the functions relating to terminal adaptation. Such service modules can in practice include Set Top Boxes, PC interfaces or LAN routers, for example. A premises distribution network PDN, located at the premises of the subscriber, connects the ATU-R to the service modules.

At the network end of the ADSL link, an access node AN constitutes a concentration point for narrowband and broadband data, at which point the traffic arriving from different service systems through different networks is concentrated. The access node is located at the exchange of a telephone network, for example.

In FIG. 1, reference A denotes the part constituted by a private network, B the part constituted by a public network, and C a network located at the premises of a subscriber (the telephones are naturally located at the subscriber).

The generic network model relating to xDSL links was set forth above in order to describe the overall environment of the invention. Since the invention relates to the part constituted by the actual ADSL link, which is located either between the local exchange and the subscriber or between a street cabinet and the subscriber, only this part located between the ADSL modems will be described in closer detail hereinbelow.

Figure 2:
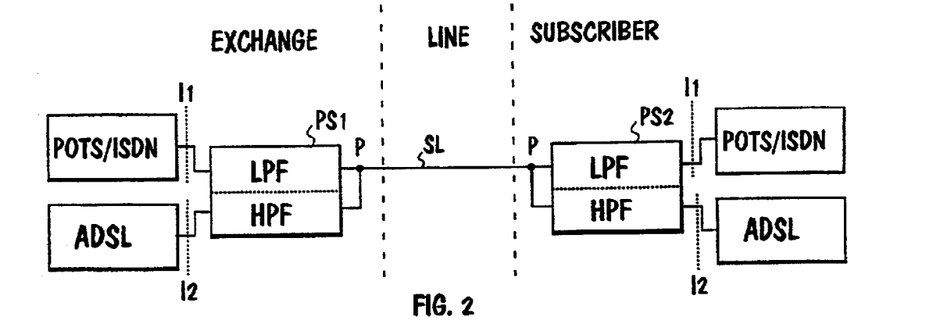
FIG. 2 shows a subscriber line divided between POTS and ADSL services.
Figure 3:
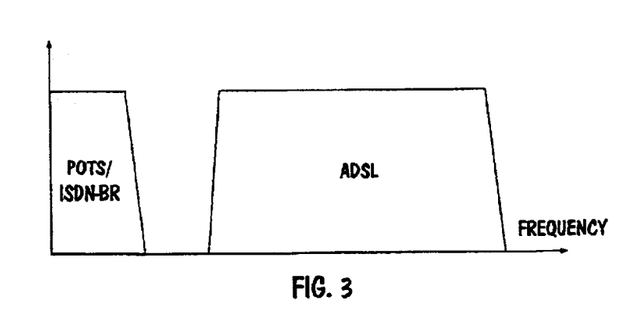
FIG. 3 shows the frequency division used in a transmission connection in accordance with the invention.

As stated previously, POTS (Plain Old Telephone Service) and ADSL services can be frequency multiplexed onto the same pair cable by means of a splitter. FIG. 2 illustrates a subscriber line divided between POTS and ADSL services, denoted with reference SL. In practice, the splitter (PS1 or PS2) comprises two filter units: a low-pass filter unit LPF prevents the access of signals of the ADSL band (25 kHz . . . 1.1 MHz) to the POTS interface I1, and a high-pass filter unit HPF prevents the access of signals of the POTS band (0 Hz . . . 4 kHz) to the ADSL interface I2. Thus, the frequency division of the link is of the kind shown in FIG. 3: signals relating to POTS or ISDN services are transferred at low frequencies, and ADSL signals are transferred at higher frequencies. The splitter has a line port (P) connected to the subscriber line. The low-pass filter unit is connected between the line port and the POTS interface I1, and the high-pass filter unit HPF is connected between the line port and the ADSL interface I2.

Figure 4:
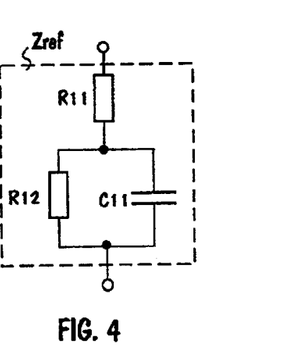
FIG. 4 illustrates the reference impedance used by operators, by means of which the viability of a splitter is estimated.

Teleoperators determine the viability of filters by means of a reference impedance, which is defined so as to correspond to the actual impedance of the subscriber link as well as possible. FIG. 4 depicts a typical reference impedance Zref used by operators, comprising a resistance (R11) followed by a parallel connection of a resistance (R12) and a capacitor (C11). Some operators define the reference impedance as real (R11=C11=0), but in a generic case, however, the reference impedance is complex. The filter must provide a sufficiently good impedance match to the reference impedance in the voice band. A perfect impedance match is achieved when the output impedance of the generator concurs with the load impedance. The operators estimate the viability of filter units by feeding to a load impedance, being equal to the reference impedance, a signal from a generator whose output impedance also equals the reference impedance. The load impedance is looked at through the filter. In such a case, the effective load impedance deviates from the reference impedance, since the filter unit can never be entirely transparent. There is no international standard relating to the impedance match, but each operator has his own quantitative measure in determining what is a sufficiently good impedance match.

The impedance match of the splitter must be as good as possible in both directions, that is, too much reflection is not allowed in either direction. In practice, such a filter unit can be implemented as a passive LC network (i.e., as a circuitry comprising windings and capacitors). In the case of a high-pass filter, LC implementation seems to be the only feasible alternative. In the case of a low-pass filter, however, this implementation is attended by significant problems, which will be described in the following.

A passive low-pass filter loads both the subscriber line and the POTS interface by its input impedance. This impedance should equal the impedance of the subscriber line and the POTS interface as well as possible before the installation of the splitter, since in that case the splitter does not impair the matching of the POTS interface to the subscriber line. However, the impedance of a passive filter cannot be designed independently of the other parameters, but the transfer function striven for and the load impedance set the boundary conditions for the impedance to be realized.

Furthermore, sufficient isolation must be provided between the POTS and ADSL services. It has been found in practice that an insertion loss of at least 40 dB is needed in the low-pass filter to ensure that the services appear to the subscriber as fully isolated from one another. Such attenuation also meets the international requirements set on the maximum signal level outside the voice band, measured at a POTS interface. In the case of most operators, however, it is not possible to achieve a sufficiently good impedance match in such a situation. The resultant mismatch diminishes the trans-hybrid loss at the exchange end and sidetone masking at the subscriber end, thus deteriorating service quality.

Hence, the characteristic impedance $Z'_0$ that is visible when the subscriber line is seen through an LC filter is in practice at least somewhat dissimilar to the characteristic impedance $Z_0$ of the plain subscriber line. However, an attempt must be made to carry out the filtering so that $Z'_0 \approx Z_0$. There are two principal alternatives for realizing the impedance matching. First, the actual filter can be implemented in such a way as to exhibit a sufficiently correct input impedance. Another alternative is to implement the filter in such a way that its input impedance clearly deviates from the ideal value, but the impedance matching is corrected by a discrete correction block. Such a correction block is termed a Generalized Immittance Converter (GIC). The alternative to be selected for the implementation is mainly dependent on the standard specifications set by the teleoperators. Some teleoperators stipulate in their specifications that the impedance matching be effected by means of a discrete GIC block.

Figure 5:
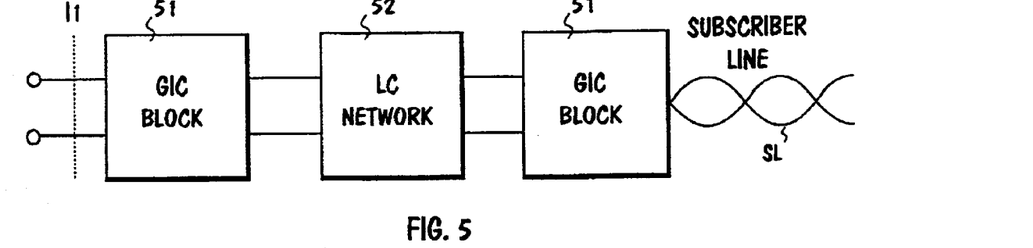
FIG. 5 illustrates a prior art impedance correction method.

A solution based on the use of a GIC block is disclosed in European patent publication EP-0742972-B1. This publication discloses a POTS splitter in which a passive filter (LC network) is used as a low-pass filter, but in addition to this, a two-way impedance correction is made by using two GIC blocks. More specifically, in the implementation disclosed in said publication the LC and GIC blocks have been used as shown in FIG. 5, i.e. in such a way that the LC network 52 serving as a low-pass filter is placed between two GIC blocks 51. Hence, in this publication the starting-point is the idea that to make the impedance matching in each direction sufficiently good, the low-pass filter must be implemented as reciprocal, i.e., mirrored.

However, in practice a GIC block is a costly and sizeable circuit element, and hence the inclusion of two such substantially similar circuit elements will render the splitter expensive and large and result in a cumbersome practical implementation.

Furthermore, a GIC block has been found to be associated with at least the following drawbacks:

In the preferred practical implementation, the input circuit of the GIC block will connect to line capacitively and the output circuit inductively. In such a case, a limited amount of transfer resistance is associated with the GIC block, which will result in an increase in the effective length of the POTS line in offhook state.

A limited amount of shunt impedance is also associated with the GIC block, which will load the line in offhook state in which the impedance is nominally infinite.

The GIC block is active, i.e. consumes power.

SUMMARY OF THE INVENTION

It is an object of the present invention to bring about an improvement to the above drawbacks by providing a solution by means of which the impedance matching can be realized in an optimal way.

This object is achieved with a solution in accordance with the invention, which is defined in the independent claims.

The idea of the invention is to compensate for the deterioration in service quality caused by the addition of the splitter asymmetrically by placing impedance conversion means wholly between the subscriber line-end interface of the passive low-pass filter and the POTS/ISDN interface. In such a case, the impedance matching can be effected either by using a single GIC block placed between the passive low-pass filter block and the POTS interface, or even entirely without a GIC block by providing the passive low-pass filter with separate resistances that afford an impedance correction effect through changing the characteristic impedance of the filter block. The last-mentioned method, however, is only intended for cases where the matching requirements are not stringent, wherefore the implementation using a single GIC block is preferable. By means of this GIC block, the impedance matching can be restored with as good accuracy as possible to correspond to the situation before the installation of the ADSL, particularly as in practice even the strictest matching requirements can be met by using, in addition to one GIC block, the above-stated resistances in the passive low-pass filter block, by means of which the matching of the filter can be improved from the subscriber line side.

The invention is based on the idea that what is essential for maintaining the quality of service is the symmetricity of the connection, not that of the splitter (filter). Since the addition of a low-pass filter to the connection causes deterioration in the balance of the impedance bridge (will be described below) in the subscriber station, a correction to be carried out by means of a discrete GIC block does not afford any significant advantage on that side of the filter in which a two-wire/four-wire conversion is not carried out. Hence, no separate GIC block is needed on the subscriber line side of the filter block, but the impedance matching can be implemented with a single block on the side of the POTS interface, using the above-stated resistances in the filter block as an aid, when necessary.

By means of the solution in accordance with the invention, high-quality xDSL service can be realized more economically and using a smaller and simpler splitter than heretofore. Furthermore, compared with a solution with two GICs, other advantages are gained with the solution, such as halving of the above transfer resistance and, in consequence, a smaller increase in the effective length in offhook state and doubling of said shunt impedance and, as a result, halving of the load in onhook state.

BRIEF DESCRIPTION OF THE DRAWINGS

The invention and its preferred embodiments will be described in greater detail in the following with reference to examples in accordance with the accompanying drawings, in which.

DETAILED DESCRIPTION OF THE INVENTION

As stated previously, the band division filtering required in xDSL technology must be realized in such a way that service quality will not appreciably deteriorate when the xDSL feature is added to the subscriber line. For the low-pass filter, this means for example that the impedance of the filter must be matched as well as possible to the subscriber line. As also stated previously, the specifications of some operators stipulate that the impedance matching be carried out by means of a discrete GIC block.

Figure 6:
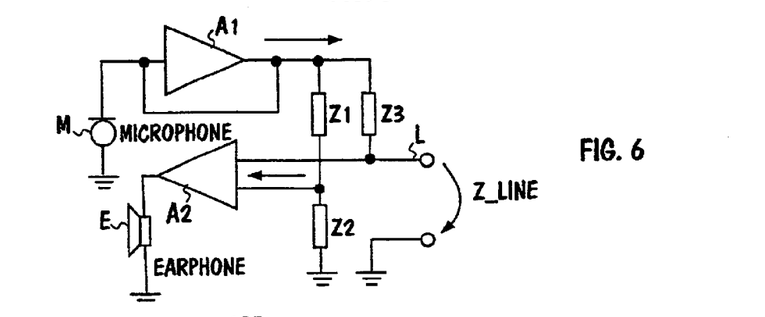
FIG. 6 illustrates prior art separation of transmission directions carried out in the subscriber connection.

As is generally known, in a conventional subscriber connection the transmission directions are separated by means of an impedance bridge (hybrid). This principle has been illustrated in FIG. 6, in which the impedance bridge is made up by impedances Z1, Z2, Z3 and line impedance Z_line. In the transmission branch, the microphone M of the telephone set is connected through amplifier A1 and impedance Z3 to line conductor L. On the other hand, the terminal of impedance Z3 on the amplifier side is connected through impedances Z1 and Z2 to ground. The common terminal of the two last-mentioned and the line conductor L form a receiving interface, which is connected through receiving amplifier A2 to earphone E. In a balanced state, Z1/Z2=Z3/Z_line applies to the impedance values. The correct operation of the impedance bridge requires that it is loaded through a subscriber line that terminates with a remote-end bridge (whose implementation in principle is identical with that of the subscriber end and which is situated at a local exchange).

Figure 7:
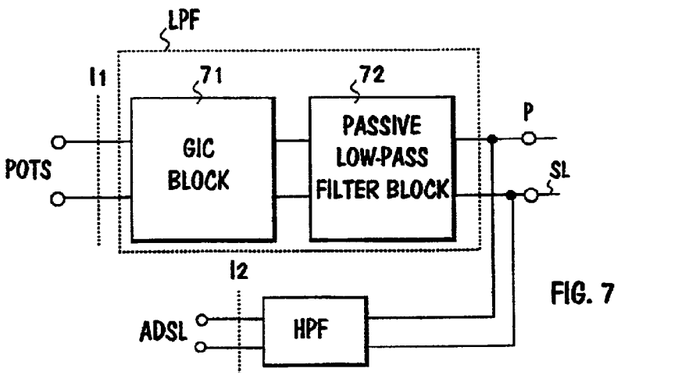
FIG. 7 illustrates a filter topology in accordance with the invention for the low-pass filter of a POTS/ADSL splitter.

The solution in accordance with the invention is based on the idea that for the quality of the telephone connection, what is essential is the symmetry of the connection and not that of the filter, whereupon the implementation with two GIC blocks is based. When the low-pass filter is incorporated into the connection, it causes deterioration of the balance of the impedance bridge. On this account, the impedance correction is implemented asymmetrically in the present invention in such a way that there is no separate GIC block on the subscriber line side of the filter, where no two-wire/four-wire conversion is carried out. In the preferred embodiment, the solution in accordance with FIG. 7 is used, in which the actual filtration is carried out in a passive low-pass filter block 72, which is typically an RLC network, and a GIC block 71, wherewith the impedance matching is restored with as high accuracy as possible to correspond to the situation before the installation of the ADSL, is placed between the POTS interface and the low-pass filter block. Hence, a GIC block is only provided on the POTS interface side of the low-pass filter block.

Figure 8:
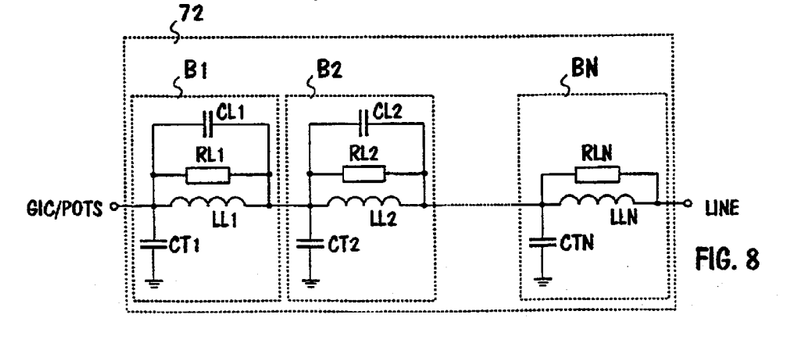
FIG. 8 illustrates a passive low-pass filter block used in the embodiment in accordance with FIG. 7 in its generic form.

The low-pass filter block 72 in its generic form is a network of the kind shown in FIG. 8, comprising N successive subblocks Bi (i=1 . . . N), each of which can comprise (relative to the subscriber line) a longitudinal capacitor CLi, a longitudinal resistance RLi, a longitudinal coil LLi and a transverse capacitor CTi (i=1 . . . N). An exception to this is the first block (BN) seen from the subscriber line, in which no longitudinal capacitances are allowed. This is because the low-pass filter must have a high input impedance in the ADSL band. Each of these components performs its own task in the filter block. The basic function, i.e. low-pass filtering, is achieved with a combination of a longitudinal coil and a transverse capacitor. By means of a longitudinal capacitor, on the other hand, attenuation can be added to a given frequency band. By means of longitudinal resistances RLi, the characteristic impedance of the filter can be shaped and thereby the impedance matching on the subscriber line side corrected, when necessary.

Figure 9:
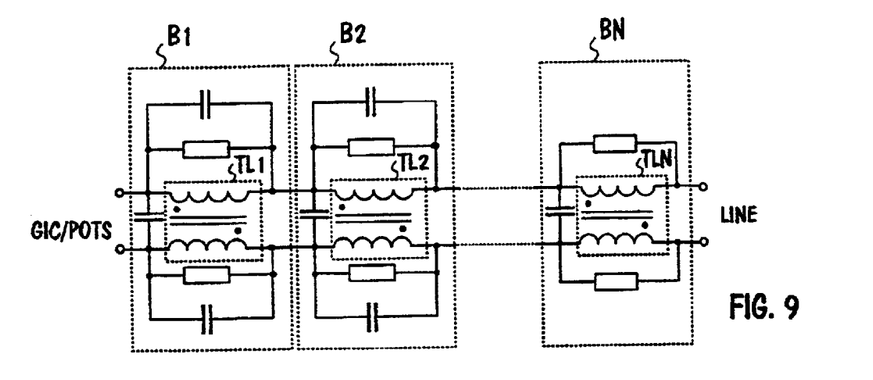
FIG. 9 illustrates a differential implementation of the filter block of FIG. 8.

The practical implementation is typically differential, the low-pass filter block being in accordance with FIG. 9. In this case, the longitudinal inductance of each block has been implemented by means of a transformer TLi (and the longitudinal resistances and capacitors are in parallel with each winding of said transformer).

The number of successive subblocks in the low-pass filter block can vary. In the simplest case, there is only one subblock (N=1); yet in practice to achieve sufficient ADSL band attenuation, at least two subblocks are needed. The quantity of subblocks is used to influence the steepness of the filter. Corresponding components have typically different values in the different subblocks. Each subblock has at least one longitudinal coil, but the entire filter block nevertheless always has at least one longitudinal coil (transformer) and one transverse capacitor. In the case of an LC network, in which longitudinal resistances are not used to influence the matching, the GIC block on the side of the POTS interface is indispensable.

The low-pass filter block is implemented using the known filter design principles, but in addition impedance matching for the subscriber line side can be attended to by longitudinal resistances, if necessary. However, the necessity thereof is dependent on whether the GIC block is indispensable and if it is, how well the matching requirements can be met with a GIC block only.

Figure 10:
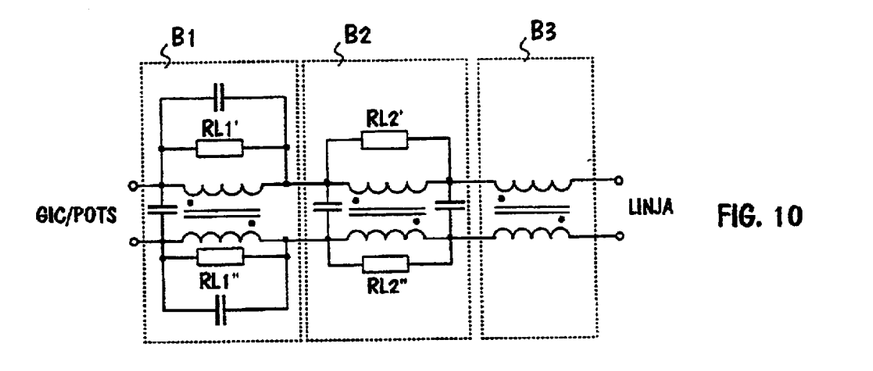
FIG. 10 illustrates a possible implementation of the filter block.

FIG. 10 illustrates an exemplary implementation of the low-pass filter block, having a total of three successive subblocks. The first subblock comprises all the components stated above, the second subblock comprises all the other components except for longitudinal capacitors, and the third subblock only comprises a longitudinal transformer. In this case, the characteristic impedance of the filter has been shaped by means of longitudinal resistances RL1', RL1", RL2', RL2". The characteristic impedance of a plain LC network is real, but it changes into complex if longitudinal resistances are introduced. In the following, two further practical design examples will be presented.

Known principles can also be applied in implementing the impedance-changing GIC block 71. What is essential for the embodiment is, among other things, that the GIC block offers a relatively transparent route (small attenuation/distortion) for the ringing voltage and direct current. The principles of the GIC block will be described in detail in the following. (These principles are also disclosed e.g. in Leonard T. Bruton, *RC-Active Circuits, Theory and Design*, Chapter 2–6.1, Prentice-Hall, Inc., ISBN 0-13-753467-1).

Figure 11:
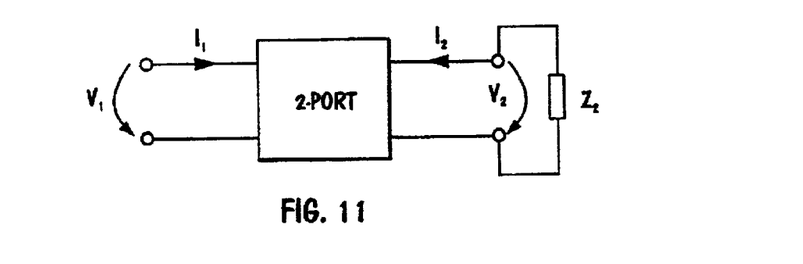
FIG. 11 illustrates a generic 2-port circuit.

A relationship exists between the currents and voltages of ports 1 and 2 in a generic 2-port circuit (FIG. 11), defined by elements A, B, C and D of the chain matrix of the port as follows:

$$\begin{bmatrix} V_1(s) \\ I_1(s) \end{bmatrix} = \begin{bmatrix} A(s) & B(s) \\ C(s) & D(s) \end{bmatrix} \begin{bmatrix} V_2(s) \\ -I_2(s) \end{bmatrix}.$$

Hence, in the generic case the matrix elements as well as the currents and voltages on the ports are frequency-dependent (s is the complex frequency to
which applies $s=j\omega=j2\pi f$, where f is the frequency and $j^2=-1$). If $$\begin{cases} B = C = 0 \\ A \neq D \end{cases}$$

holds true, an impedance-changing 2-port is concerned. This means that the input impedance $Z_1$ $(=V_1/I_1)$ of port 1 and the load impedance $Z_2$ of port 2 are connected by the relation $$Z_1 = \frac{A(s)Z_2}{D(s)} = F(s)Z_2.$$

Figure 12:
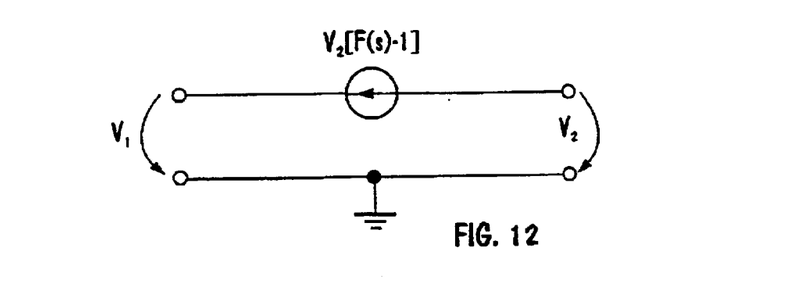
FIG. 12 illustrates the principle of implementation of an impedance-converting GIC.

Hence, the impedance present on port 1 is equal to the load impedance on port 2 multiplied by a function of the complex frequency, which is independent of the load impedance. A 2-port having such a chain matrix can be implemented by connecting a voltage source controlled by the voltage on port 2 between the ports in accordance with FIG. 12.

Figure 13:
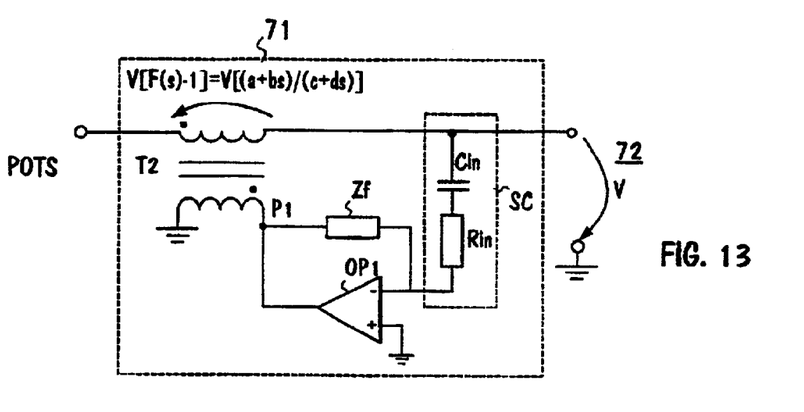
FIG. 13 illustrates a practical implementation of the impedance-converting GIC in a unipolar case.

It is preferable to connect the controlled source to a practical subscriber line using a circuit topology as shown in FIG. 13, in which the input of the voltage source (operational amplifier OP1) connects to line capacitively and the output inductively. This solution has the advantage that the necessary components are (physically and/or electrically) as small in size as possible. In the connection of FIG. 13, the non-inverted input of the operational amplifier is connected to ground potential and its inverted input to line through a sense circuit SC comprising a resistance Rin and capacitor Cin. By means of this RC circuit, the line voltage is sampled to the operational amplifier. Capacitance Cin has a high value so that in the voice band the capacitance can approximately be presumed as a short circuit, in which case the amplifier has a resistive input (in the voice band). The feedback loop of the operational amplifier has an impedance Zf, which is a function of the complex frequency s, in which case a voltage V[(a+bs)/(c+ds)] is obtained at point P1 when V is the input voltage, where a and b are constants. This voltage is converted in transformer T2 to longitudinal format for the line. Thus, the connection of FIG. 13 adheres to the principle of FIG. 12.

Figure 14:
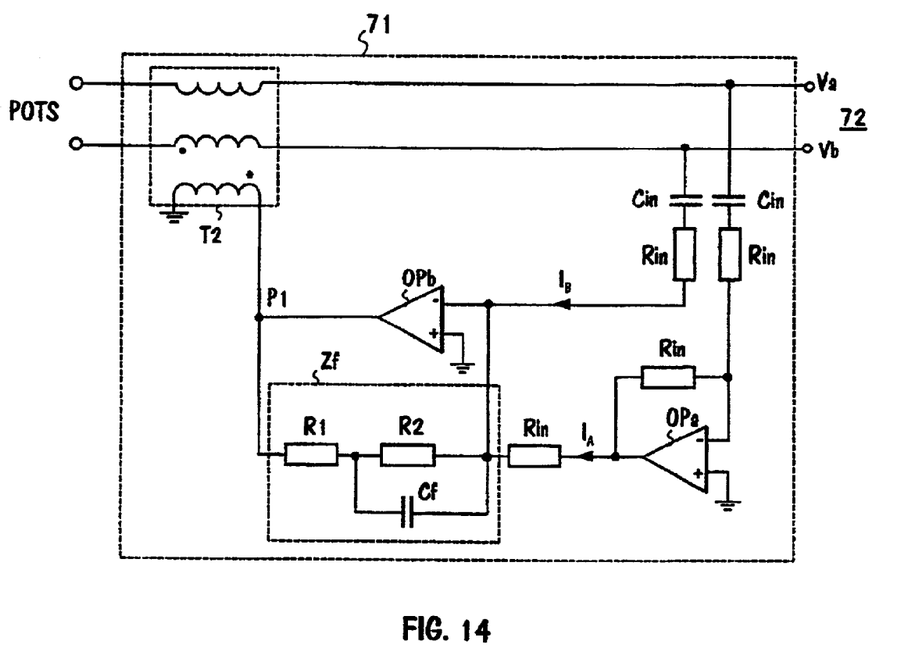
FIG. 14 illustrates the practical implementation of the GIC of FIG. 13 in a differential case.

In practice, the subscriber line is a two-wire line, and thus the connection must be carried out differentially. FIG. 14 illustrates such an implementation. In this case, a current $I_B$ is obtained at the input of operational amplifier OPb, said current being proportional to the potential Vb in wire b. By means of operational amplifier OPa, analog inversion is performed, and thus a current $I_A$, proportional to the potential −Va when Va is the potential of wire a, is obtained at the output of the amplifier. By means of operational amplifier OPb, these currents are added together to the feedback leg provided by impedance Zf, which gives a voltage of the above-described format at point P1.

However, the implementation of a GIC block in accordance with FIG. 14 is associated with a problem: the connection converts a common mode voltage to differential. Two alternative solutions can be offered to the problem:

1. The filter is implemented in such a way that in practice there is a finite impedance to the earth from the ground potential of the electronics, i.e., the electronics of the filter floats.

2. The resistances and capacitors of the input circuit of the GIC block are selected so that the asymmetry is negligible.

In a practical implementation, only alternative 1 seems to be realistic, as selection of the resistances and capacitors in accordance with point 2 is very expensive.

Figure 15:
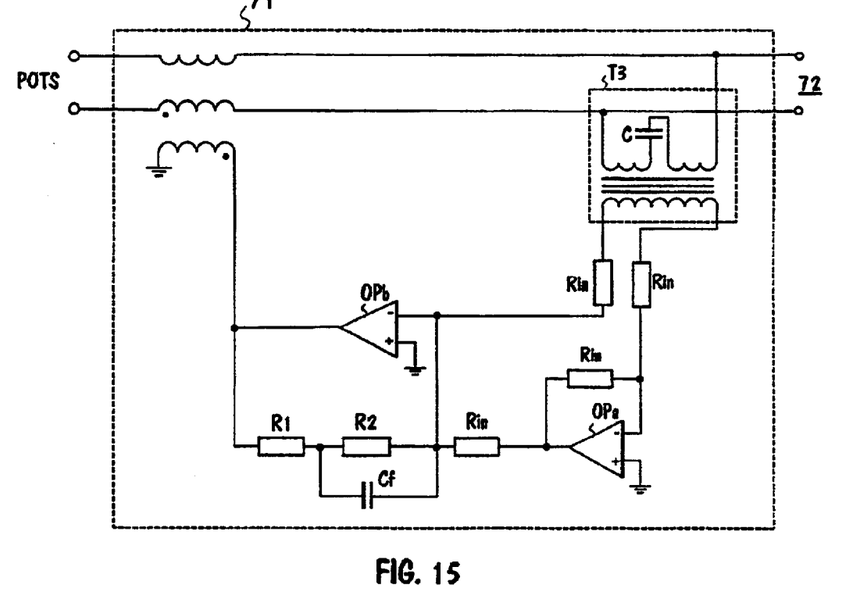
FIG. 15 illustrates the GIC block of FIG. 14 when both its input and its output are inductively connected to line.

FIG. 15 shows a GIC block in which both the input and the output circuit are inductively connected to line. In this case, input capacitances Cin are not needed (the tapping point of the primary winding has capacitor C), and thus the resistances Rin are directly connected to the ends of the secondary winding of transformer T3. Transformer T3 can be implemented highly symmetrically compared to discrete resistances and capacitors, and hence no special attention need to be paid to earthing arrangements when this topology is used. However, this connection is not optimal either, as both the main inductance of transformer T3 and the capacitance of capacitor C must be remarkably high. In practice, this will result in physically large components.

However, when high capacitances (of the order one microfarad or more) are used, there is a risk that the telephone set will not ring when the ringing tone generator of the exchange is capacitively loaded. Also for this reason, it is highly disadvantageous to use an implementation with two GIC blocks. Therefore, an additional advantage of the invention is that such a risk will be made smaller in said implementations.

As stated previously, if the matching requirements set by the teleoperator are not stringent, it is in practice possible to realize the matching by means of an RLC network only, by dimensioning of the longitudinal resistances.

Figure 16A:
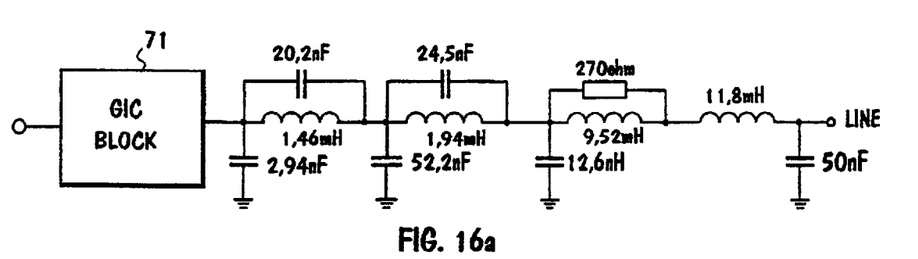
FIGS. 16a and 16b illustrate practical examples of dimensioning the low-pass filter block.
Figure 16B:
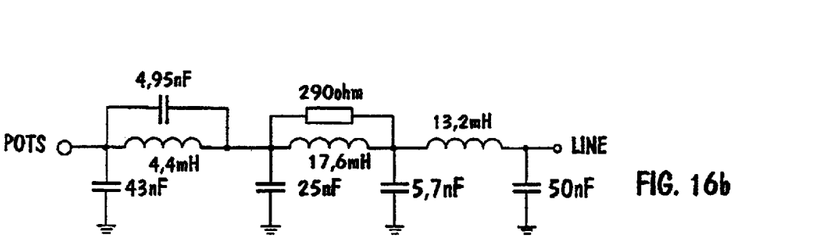

FIGS. 16a and 16b show two practical dimensioning examples of the low-pass filter block. In the case of FIG. 16a, a GIC block has been used (preferably in accordance with e.g. FIG. 13), whereas in the case of FIG. 16b the matching is attended to by an RLC network only. In the figures, the input capacitance 50 nF (which is naturally not fitted in the filter) of the ADSL modem is shown first as seen from the direction of the line. It has been presumed in the design that a twisted pair cable of a length of 3 km wherein the thickness of a single copper wire is 0.4 mm is used in the subscriber connection. Such a wire thickness is the most common in European telephone networks. The component values of the reference impedance Zref simulating the subscriber station were: R11=270Ω, R12=750Ω and C11=150 nF. Said dimensioning will in the presumed environment give the result that the subscriber will not be able to hear any weakening when the splitter is added to the subscriber line. Thus, from the point of the subscriber the service implemented can in practice have as high a quality as that implemented with two GIC blocks, but the above drawbacks associated with the implementation with two GIC blocks can be eliminated.

Even though the invention has been explained in the foregoing with reference to examples in accordance with the accompanying drawings, it is obvious that the invention is not restricted thereto, but it can be modified within the scope of the inventive idea set forth above and in the appended claims. As stated previously, for example the GIC block may be of any known type. Such blocks have been disclosed for example in the European patent publication referred to above. It is true, however, that the practical drawbacks of a current GIC (FIG. 7 in the European publication) include a high surface area consumption (possible ring tone problem) and the fact that the symmetry problem will not be entirely eliminated otherwise than by the earth floating described above.

What is claimed is:

1. A method for implementing narrowband and broadband services on a transmission link of a telecommunications network, the method comprising the steps of:

transferring signals belonging to a narrowband service in a first frequency range below a given threshold frequency and signals belonging to a broadband service in a second frequency range above said threshold frequency in the transmission link;

separating signals relating to the narrowband service in a passive low-pass filter block connected between the transmission link and a single discrete active impedance converting means;

receiving the signals relating to the narrowband service from the passive low-pass filter block in the discrete active impedance converting means, said discrete active impedance converting means located entirely between the passive low-pass filter block and a first interface;

matching impedance of the first interface to a characteristic impedance of the transmission link in said discrete active impedance converting means, wherein matching is conducted without external control entirely after the step of separating the signals relating to the narrowband service; and separating signals relating to a broadband service in a high-pass filter unit connected between the transmission link and a second interface.

2. A splitter element in a telecommunications system for separating signals transferred in different frequency ranges, said splitter element comprising:

a line port connected to a transmission link, the transmission link configured to transfer signals belonging to a narrowband service in a first frequency range below a given threshold frequency and signals belonging to a broadband service in a second frequency range above said threshold frequency;

a passive low-pass filter block connected between the line port and a discrete active impedance converting means and configured to separate signals relating to the narrowband service;

the discrete active impedance converting means for adapting a first interface to a characteristic impedance of the transmission link, said first interface being intended for signals relating to narrowband service, wherein the discrete active impedance converting means locates entirely between the passive low-pass filter block and the first interface and is configured to conduct the adapting without external control entirely after separating the signals relating to narrowband service in the passive low-pass filter block; and a high-pass filter connected between the line port and a second interface and configured to separate signals relating to the broadband service, said second interface being intended for signals transferred in a higher frequency range.

* * * * *